United States Patent
Bookbinder et al.

(10) Patent No.: US 10,921,512 B2
(45) Date of Patent: Feb. 16, 2021

(54) MULTI-MODE OPTICAL FIBER AND METHODS FOR MANUFACTURING THE SAME

(71) Applicant: Corning Incorporated, Corning, NY (US)

(72) Inventors: Dana Craig Bookbinder, Corning, NY (US); Curtis Richard Cowles, Corning, NY (US); Richard Michael Fiacco, Corning, NY (US); Ming-Jun Li, Horseheads, NY (US); Jason Roy Pace, Painted Post, NY (US); Jeffery Scott Stone, Addison, NY (US)

(73) Assignee: Corning Incorporated, Corning, NY (US)

( * ) Notice: Subject to any disclaimer, the term of this patent is extended or adjusted under 35 U.S.C. 154(b) by 87 days.

(21) Appl. No.: 16/141,257

(22) Filed: Sep. 25, 2018

(65) Prior Publication Data

US 2019/0101694 A1  Apr. 4, 2019

Related U.S. Application Data

(60) Provisional application No. 62/566,656, filed on Oct. 2, 2017.

(51) Int. Cl.
| | |
|---|---|
| *C03B 37/03* | (2006.01) |
| *G02B 6/028* | (2006.01) |
| *G02B 6/036* | (2006.01) |
| *G02B 6/02* | (2006.01) |
| *C03B 37/027* | (2006.01) |

(52) U.S. Cl.
CPC ...... *G02B 6/0288* (2013.01); *C03B 37/02763* (2013.01); *C03B 37/032* (2013.01); *G02B 6/02* (2013.01); *G02B 6/03627* (2013.01); *C03B 2203/18* (2013.01); *C03B 2203/26* (2013.01)

(58) Field of Classification Search
CPC ..................... C03B 37/02763; C03B 2203/18
See application file for complete search history.

(56) References Cited

U.S. PATENT DOCUMENTS

| | | |
|---|---|---|
| 3,909,110 A | 9/1975 | Marcuse |
| 3,912,478 A | 10/1975 | Presby |
| 3,969,016 A | 7/1976 | Kaiser et al. |

(Continued)

FOREIGN PATENT DOCUMENTS

WO   WO-03066537 A1 * 8/2003 ......... C03B 37/0253

*Primary Examiner* — Charlie Y Peng
(74) *Attorney, Agent, or Firm* — Robert L. Carlson (57) ABSTRACT

Methods of manufacturing multi-mode optical fiber, and multi-mode optical fiber produced thereby, are disclosed. According to embodiments, a method for forming an optical fiber may include heating a multi-mode optical fiber preform and applying a draw tension to a root of the multi-mode optical fiber preform on a long axis of the multi-mode optical fiber preform thereby drawing a multi-mode optical fiber from the root of the multi-mode optical fiber preform. The draw tension may be modulated while the multi-mode optical fiber is drawn from the root of the multi-mode optical fiber preform. Modulating the draw tension introduces stress perturbations in the multi-mode optical fiber and corresponding refractive index perturbations in a core of the multi-mode optical fiber.

19 Claims, 7 Drawing Sheets

(56) References Cited

U.S. PATENT DOCUMENTS

| | | | |
|---|---|---|---|
| 4,028,081 A * | 6/1977 | Marcatili | C03B 37/022 |
| | | | 65/392 |
| 4,038,062 A | 7/1977 | Presby | |
| 4,049,413 A | 9/1977 | French | |
| 5,851,259 A * | 12/1998 | Clayton | C03B 37/0253 |
| | | | 65/377 |
| 6,542,679 B2 | 4/2003 | DiGiovanni et al. | |
| 7,450,806 B2 | 11/2008 | Bookbinder et al. | |
| 7,536,877 B2 | 5/2009 | Hong et al. | |
| 7,787,731 B2 | 8/2010 | Bookbinder et al. | |
| 8,385,703 B2 | 2/2013 | Bennett et al. | |
| 8,588,568 B2 | 11/2013 | Bookbinder et al. | |
| 9,594,212 B2 | 3/2017 | Bookbinder et al. | |
| 2001/0003911 A1* | 6/2001 | Okuno | G02B 6/02247 |
| | | | 65/435 |
| 2004/0194512 A1* | 10/2004 | Hong | G02B 6/02 |
| | | | 65/402 |
| 2005/0126227 A1* | 6/2005 | Collaro | G01M 11/37 |
| | | | 65/378 |
| 2005/0135760 A1* | 6/2005 | Bickham | G02B 6/03633 |
| | | | 385/124 |

\* cited by examiner

MULTI-MODE OPTICAL FIBER AND METHODS FOR MANUFACTURING THE SAME

The present application claims the benefit of priority under 35 U.S.C. § 119 to U.S. Provisional Patent Application No. 62/566,656, filed on Oct. 2, 2017, the contents of which are relied upon and incorporated herein by reference in its entirety.

BACKGROUND

Field

The present specification generally relates to multi-mode optical fiber and, more specifically, to methods for manufacturing multi-mode optical fiber which increase the wavelength operating window of the multi-mode optical fiber and multi-mode optical fiber produced therefrom.

Technical Background

In recent years optical fiber has become accepted as a viable alternative to traditional materials used for data signal communication. Optical fiber, such as multi-mode optical fiber, is now widely utilized in a variety of electronic systems to facilitate high-speed communication of data signals between various components.

As the bandwidth of digital electronic components continues to increase, so too does the need for optical fibers capable of communicatively coupling these electronic components while maintaining the bandwidth of the electronic components.

Accordingly, a need exists for alternative methods for manufacturing optical fibers that increase the wavelength operating window of the optical fiber and multi-mode optical fiber produced therefrom.

SUMMARY

According to embodiments, a method for forming an optical fiber may include heating a multi-mode optical fiber preform and applying a draw tension to a root of the multi-mode optical fiber preform on a long axis of the multi-mode optical fiber preform thereby drawing a multi-mode optical fiber from the root of the multi-mode optical fiber preform. The draw tension may be modulated while the multi-mode optical fiber is drawn from the root of the multi-mode optical fiber preform. Modulating the draw tension introduces stress perturbations in the multi-mode optical fiber and corresponding refractive index perturbations in a core of the multi-mode optical fiber.

According to other embodiments, a method for forming optical fiber may include heating an optical fiber preform and applying a draw tension to a root of the optical fiber preform on a long axis of the optical fiber preform thereby drawing a multi-mode optical fiber from the root of the optical fiber preform. The multi-mode optical fiber may be drawn through a tension modulator, wherein an eccentric guide wheel of the tension modulator contacts and displaces the multi-mode optical fiber from a draw pathway of the multi-mode optical fiber in a direction transverse to the draw pathway, thereby modulating the draw tension applied to the fiber. Modulating the draw tension introduces stress perturbations in the optical fiber and corresponding refractive index perturbations in a core of the optical fiber.

According to other embodiments, an optical fiber may include a core portion comprising a radially graded index of refraction having an alpha profile, wherein stress in the core portion of the optical fiber varies as a function of a length of the optical fiber such that an index of refraction of the core portion varies as a function of the length of the optical fiber. The optical fiber may further include a glass cladding portion surrounding and in direct contact with the core portion. The optical fiber may be multi-moded. The optical fiber may have a bandwidth greater than or equal to 3000 MHz-km for each wavelength within a wavelength operating window centered on a wavelength within an operating wavelength range greater than or equal to 850 nm and less than or equal to 1550 nm. The wavelength operating window may have a width greater than 100 nm.

Additional features and advantages of the multi-mode optical fiber and the methods for manufacturing multi-mode optical fiber described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 2:
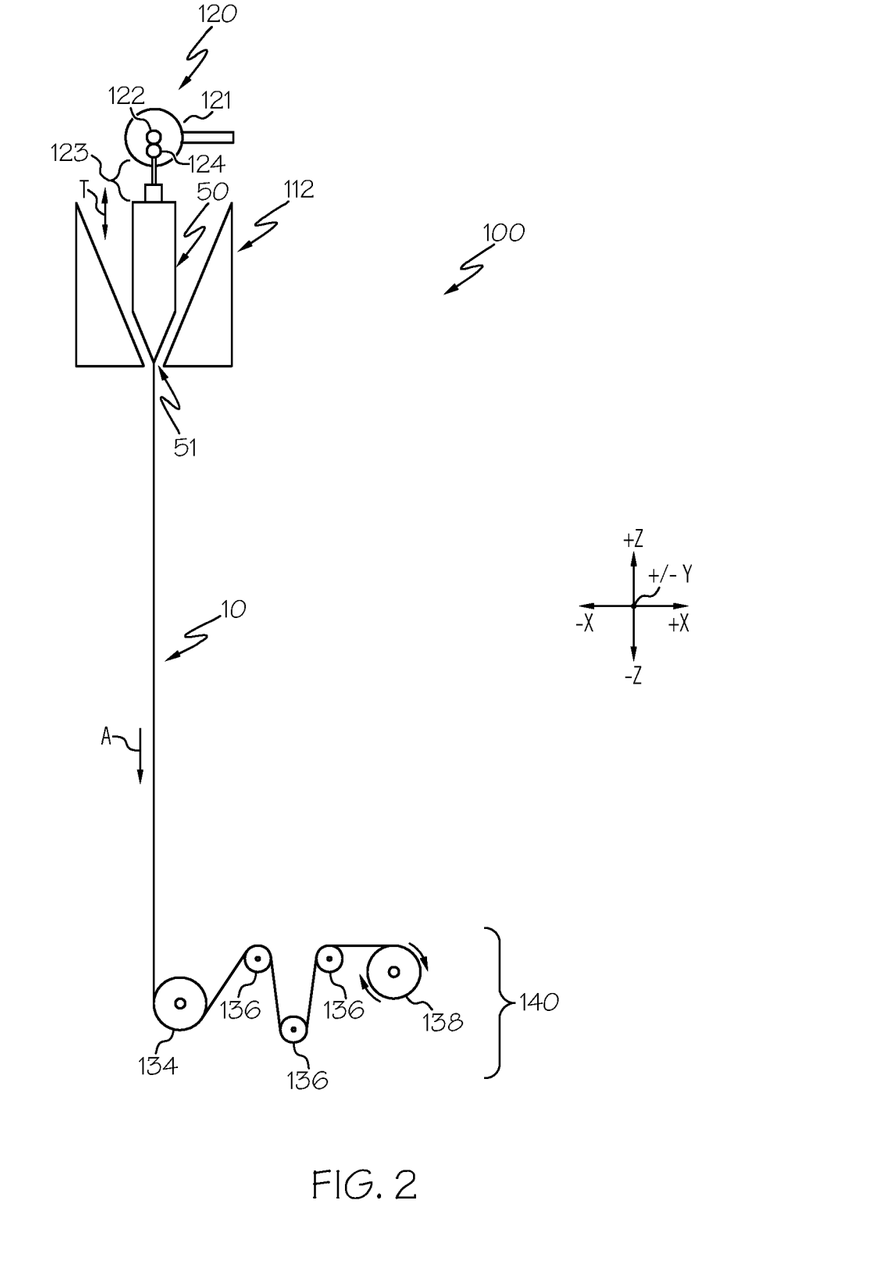
FIG. 2 schematically depicts a system for manufacturing multi-mode optical fiber according to one or more embodiments shown and described herein.

Reference will now be made in detail to embodiments of methods for manufacturing multi-mode optical fiber and multi-mode optical fiber produced therefrom, examples of which are illustrated in the accompanying drawings. Whenever possible, the same reference numerals will be used throughout the drawings to refer to the same or like parts. One embodiment of a method for manufacturing multi-mode optical fiber is schematically depicted in FIG. 2. The method generally includes heating an optical fiber preform and applying a draw tension to a root of the optical fiber preform on a long axis of the optical fiber preform thereby drawing a multi-mode optical fiber from the root of the optical fiber preform. The multi-mode optical fiber may be drawn through a tension modulator, wherein an eccentric guide wheel of the tension modulator contacts and displaces the multi-mode optical fiber from a draw pathway of the multi-mode optical fiber in a direction transverse to the draw pathway, thereby modulating the draw tension applied to the fiber. Modulating the draw tension introduces stress perturbations in the optical fiber and corresponding refractive index perturbations in a core of the optical fiber. Various embodiments of methods for manufacturing multi-mode optical fiber, and multi-mode optical fiber produced therefrom, will be described in further detail herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The following terminology will be used in conjunction with the optical fiber described herein:

The term "refractive index profile" or "relative refractive index profile," as used herein, is the relationship between the refractive index or the relative refractive index and the radius R of the fiber.

The term "relative refractive index," as used herein, is defined as:

$$\Delta(r)\% = 100 \times \frac{(n(r)^2 - n_{REF}^2)}{2n(r)^2},$$

where n(r) is the refractive index at radius r of the optical fiber, unless otherwise specified, and r=0 corresponds to the centerline of the fiber. The relative refractive index is defined at 1550 nm unless otherwise specified. In the embodiments described herein, the reference index $n_{REF}$ is the refractive index of the outer cladding. As used herein, the relative refractive index is represented by $\Delta$ and its values are given in units of "%," unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

The term "up-dopant," as used herein, refers to a dopant which raises the refractive index of glass relative to pure, undoped $SiO_2$. The term "down-dopant," as used herein, is a dopant which has a propensity to lower the refractive index of glass relative to pure, undoped $SiO_2$. An up-dopant may be present in a region of an optical fiber having a negative relative refractive index when accompanied by one or more other dopants which are not up-dopants. Likewise, one or more other dopants which are not up-dopants may be present in a region of an optical fiber having a positive relative refractive index. A down-dopant may be present in a region of an optical fiber having a positive relative refractive index when accompanied by one or more other dopants which are not down-dopants. Likewise, one or more other dopants which are not down-dopants may be present in a region of an optical fiber having a negative relative refractive index.

The term "α-profile" or "alpha profile," as used herein, refers to a relative refractive index profile, expressed in terms of $\Delta$ which is in units of "%," where r is the radius and which follows the equation, $$\Delta = \Delta_{1max}\left[1 - \left(\frac{r}{r_1}\right)^\alpha\right],$$

where $\Delta_{1max}$ is the maximum relative refractive index, $r_1$ is the radius of the core, r is in the range $r_i \leq r \leq r_f$, $\Delta$ is as defined above, $r_i$ is the initial point of the α-profile, $r_f$ is the final point of the α-profile, and α is an exponent which is a real number, also referred to herein as the "alpha value". For a graded index profile, the alpha value is less than 10. The term "parabolic," as used herein, includes substantially parabolically shaped refractive index profiles which may vary slightly from an alpha value of 2.0 at one or more points in the core, as well as profiles with minor variations and/or a centerline dip.

The overfilled bandwidth is measured according to FOTP-204 using an overfilled launch.

Axial stress verses the length of the multi-mode optical fiber is measured with an IFA-100 Fiber Index Profiler from Interfiber Analysis, LLC, (Sharon, Mass., USA) using the Mach-Zehnder interferometer method.

Unless otherwise specified herein, measurements of the properties of the optical fiber are taken at an operating wavelength of at least one of 850 nm, 980 nm, 1060 nm, 1310 nm, 1500 nm, or 1550 nm.

The terms "microns" and "μm" are used interchangeably herein.

The embodiments described herein relate to techniques for manufacturing multi-mode optical fiber to improve the bandwidth of the multi-mode optical fiber and multi-mode optical fiber produced therefrom. The term "multi-mode," when used in conjunction with optical fiber, means that the optical fiber supports the propagation of multiple modes of electromagnetic radiation at wavelengths up to and including 1310 nm or even greater.

Figure 1:
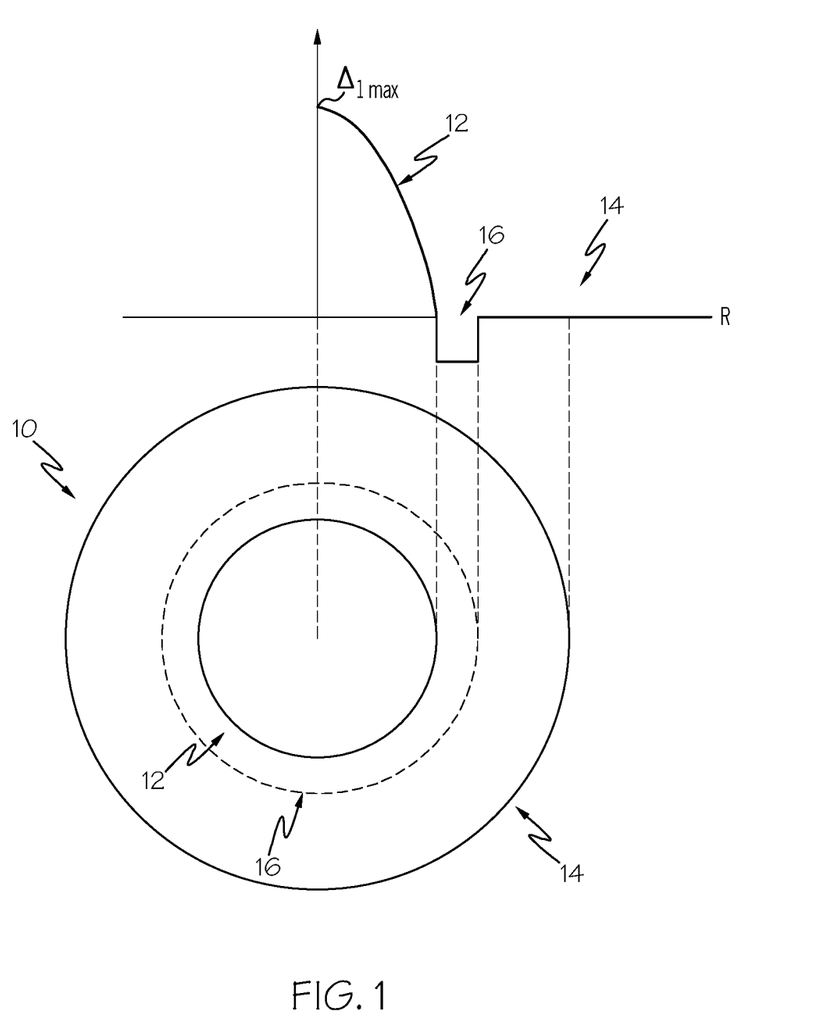
FIG. 1 schematically depicts a cross section of the glass portion of an exemplary multi-mode optical fiber and an exemplary refractive index profile for the multi-mode optical fiber.

Various physical structures for multi-mode optical fibers are known, such as, for example and without limitation, the multi-mode optical fibers disclosed in U.S. Pat. Nos. 9,594,212, 8,385,703, 8,588,568, and 7,787,731, each of which is assigned to Corning Incorporated. Referring to FIG. 1 as an example, a multi-mode optical fiber 10 generally includes a core portion 12 and a cladding portion 14 surrounding the core portion 12. A coating (not shown), such as a polymer coating, may be positioned around the cladding portion 14. Both the core portion 12 and the cladding portion 14 may be formed from silica ($SiO_2$) glass. Hence, the core portion 12 and the cladding portion 14 may be referred to as the glass portion of the multi-mode optical fiber 10. The silica glass may be up-doped with an up-dopant or down-doped with a down-dopant to alter the index of refraction of the silica glass relative to pure, un-doped silica glass. The core portion 12 and cladding portion 14 are constructed (and doped) to facilitate the propagation of multiple modes of electromagnetic radiation within the core portion 12 of the optical fiber 10. The refractive index (n) and relative refractive index ($\Delta$) of the core portion 12 are generally greater than the refractive index and relative refractive index of the cladding portion 14 as indicated in FIG. 1.

In some multi-mode optical fiber designs the cladding portion 14 may optionally include features to further enhance the properties of the multi-mode optical fiber 10. For example and without limitation, the cladding portion 14 of the multi-mode optical fiber 10 may optionally contain one or more sub-regions including, for example, an annular region 16 having a depressed refractive index (and relative refractive index) relative to the balance of the cladding portion 14 and the core portion 12. This optional annular region 16 with a depressed refractive index may assist in improving the bend performance of the multi-mode optical fiber 10.

For multi-mode optical fiber utilized in applications where a relatively high bandwidth (e.g., a bandwidth of greater than 2000 MHz-km) is desired and/or required, the core portion 12 of the multi-mode optical fiber 10 may be formed with a graded refractive index profile (i.e., an alpha profile) as graphically depicted in FIG. 1. Forming the core portion 12 with an alpha profile generally increases the bandwidth of the multi-mode optical fiber 10 for wavelengths within a certain wavelength operating window. The wavelength operating window for which the bandwidth is increased is dictated, at least in part, by the shape of the alpha profile. The shape of the alpha profile is, in turn, dictated by the alpha value.

Specifically referring to the relative refractive index profile depicted in FIG. 1, the core portion 12 of the multi-mode optical fiber has a maximum relative refractive index $\Delta_{1max}\%$ relative to the cladding portion 14 (specifically the radially outermost cladding portion) proximate to the center of the core portion 12. Although not depicted in FIG. 1, in some embodiments, the relative refractive index profile of the core portion 12 may have a centerline dip such that the maximum refractive index of the core portion 12, and the maximum refractive index of the entire multi-mode optical fiber 10, is located a small distance away from the centerline of the core portion 12 rather than at the centerline of the core portion 12, as depicted in FIG. 1. In the embodiment of the multi-mode optical fiber 10 depicted in FIG. 1, the refractive index of the core portion 12 decreases with increasing radius from the center of the core portion 12. That is, the refractive index is graded from the center of the core portion 12 to the cladding portion 14 as a function of the radius of the core portion 12. In the embodiment of the multi-mode optical fiber depicted in FIG. 1, the relative refractive index profile of the core portion 12 has the form of an alpha profile. Typical alpha values for multi-mode optical fibers are in the range from greater than or equal to 1.95 and less than or equal to 2.15, including greater than or equal to 1.98 and less than or equal to 2.05 or even greater than or equal to 2.0 and less than or equal to 2.1.

The change in the refractive index from the center of the core portion 12 to the cladding portion 14 is due to variations in the concentration(s) of dopants in the silica glass. For example, the core portion 12 may be doped with one or more up-dopants, such as $GeO_2$, $Al_2O_3$, $P_2O_5$, $TiO_2$, $ZrO_2$, $Nb_2O_5$ and/or $Ta_2O_5$, and the concentration of the up-dopant may vary (e.g., decrease) with increasing radius from the center of the core portion 12 resulting in the desired alpha profile in the core portion 12 and, in turn, the desired bandwidth characteristics of the multi-mode optical fiber 10.

Doping of the core portion 12 of the multi-mode optical fiber 10 is generally done during assembly and/or lay-up of the optical fiber preform from which the multi-mode optical fiber 10 is drawn. For example, the refractive index profile of the multi-mode optical fiber is first established so that the multi-mode optical fiber has the desired optical characteristics (e.g., bandwidth, etc.). The design is then scaled to the dimensions of the optical fiber preform from which the multi-mode optical fiber will be drawn. When a relatively high bandwidth is desired, the refractive index profile will generally include an alpha profile for the core portion, as noted herein. The alpha value of the alpha profile is selected to maximize the bandwidth of the multi-mode optical fiber at a particular wavelength or range of wavelengths (i.e., a wavelength operating window). Once the refractive index profile has been established, the optical fiber preform is assembled and/or laid-up such that the resultant preform has the desired refractive index profile that will ultimately be present in the multi-mode optical fiber drawn from the preform.

Variations in the concentration of dopants introduced in the glass of the core portion during assembly or lay-up of the optical fiber preform may result in subtle variations in the shape of the alpha profile. Indeed, it has been found that even small changes in the alpha profile (such as small changes in the alpha value as a result of variations in dopant concentrations) may result in the bandwidth of the multimode optical fiber shifting to a different peak wavelength, effectively narrowing the bandwidth at the operating wavelength the multi-mode optical fiber was designed for.

The methods for forming multi-mode optical fibers described herein, and the multi-mode optical fibers produced therefrom, increase the wavelength operating window of the multi-mode optical fiber and desensitize the peak bandwidth of the multi-mode optical fiber to changes in the alpha profile and, hence, desensitize the peak bandwidth to wavelength.

More specifically, the methods for manufacturing multi-mode optical fibers described herein introduce stress perturbations in the glass of the multi-mode optical fiber along the axial length of the multi-mode optical fiber as the fiber is drawn from the preform. These stress perturbations effectively change the local index of refraction of the core portion 12 of the multi-mode optical fiber 10 in the location of the stress perturbation. That is, the stress perturbations along the axial length of the multi-mode optical fiber cause corresponding variations in the index of refraction of the core portion 12 of the multi-mode optical fiber 10 along the axial length of the fiber. The variations in the index of refraction result in coupling and/or mixing of the different modes of electromagnetic radiation propagating in the core portion 12 of the multi-mode optical fiber which, in turn, increases the wavelength operating window of the multi-mode optical fiber 10 and desensitizes the peak bandwidth of the optical fiber to wavelength. That is, the stress perturbations have the effect of broadening the range of operating wavelengths for which the bandwidth of the multi-mode optical fiber is maximized.

Referring now to FIG. 2, one embodiment of a system 100 for manufacturing multi-mode optical fiber 10 is schematically depicted. In this embodiment, the system 100 includes a draw furnace 112 for heating an optical fiber preform 50 such that multi-mode optical fiber 10 can be drawn from the preform. The draw furnace 112 is generally oriented along a draw pathway, schematically indicated by arrow A in FIG. 2. In the embodiments described herein the draw pathway A is generally vertical (i.e., parallel to the z-axis of the coordinate axes depicted in the figures).

The system 100 for manufacturing multi-mode optical fiber 10 further includes a tractor system 140. The tractor system 140 includes one or more drawing pulleys 136 and one or more tensioning pulleys 134 (one depicted in FIG. 2). The tensioning pulleys 134, in concert with the drawing pulleys 136, provide the necessary draw tension to the multi-mode optical fiber 10 to draw the multi-mode optical fiber 10 from the preform 50 and through the system 100. The tractor system 140 may optionally include a fiber storage spool onto which the multi-mode optical fiber 10 may be wound. That is, the tractor system 140 utilizes the drawing pulleys 136 and tensioning pulleys 134 to facilitate winding the multi-mode optical fiber 10 onto the fiber storage spool 138.

In the embodiment depicted in FIG. 2, the system 100 for manufacturing multi-mode optical fiber 10 further includes a mechanical oscillator 120. The mechanical oscillator 120 may be used to modulate (i.e., increase and decrease) the draw tension applied to the multi-mode optical fiber 10 with the tractor system 140 as the multi-mode optical fiber 10 is drawn from a root 51 of the optical fiber preform, thereby forming stress perturbations in the multi-mode optical fiber 10 as it is drawn from the optical fiber preform 50. In the embodiment depicted in FIG. 2, the mechanical oscillator 120 modulates the draw tension applied to the multi-mode optical fiber 10 by vertically displacing the optical fiber preform 50 within the draw furnace 112.

Specifically, the mechanical oscillator 120 is coupled to the optical fiber preform 50 and displaces the optical fiber preform 50 along a vertical axis that is parallel to a long axis of the optical fiber preform 50 (i.e., the axis of the optical fiber preform 50 that is parallel to the z-axis of the coordinate axis depicted in FIG. 2) as indicated by arrow T. The optical fiber preform 50 is initially at a starting or nominal position and the draw tension applied to the optical fiber preform 50 is a nominal draw tension. The optical fiber preform 50 is heated in the draw furnace 112 and the nominal draw tension is applied to the root 51 of the optical fiber preform 50 on the long axis of the optical fiber preform 50 with the tractor system 140 thereby drawing a multi-mode optical fiber 10 from the root 51 of the optical fiber preform 50.

As the mechanical oscillator 120 displaces the optical fiber preform 50 in the +z direction, the draw tension exerted on the multi-mode optical fiber 10 by the tractor system 140 increases from the nominal tension. As the mechanical oscillator 120 displaces the optical fiber preform 50 in the −z direction and towards the nominal position, the draw tension decreases and is ultimately restored to the nominal tension. The tensile stresses imparted to the multi-mode optical fiber 10 by the tractor system 140 (or by the tractor system 140 and the mechanical oscillator 120) are frozen in to the multi-mode optical fiber 10 as the optical fiber 10 is drawn in the −z direction and cooled, resulting in stress perturbations in the multi-mode optical fiber 10 and corresponding refractive index perturbations in at least a core of the multi-mode optical fiber. In embodiments, the stress perturbations are throughout the entire glass portion of the multi-mode optical fiber 10 (i.e., in both the core portion of the multi-mode optical fiber 10 and the cladding portion of the multi-mode optical fiber 10).

In the embodiment of the mechanical oscillator 120 depicted in FIG. 2, the mechanical oscillator includes a motor (not shown) and a plate 121 coupled to an armature 122 of the motor such that the plate 121 rotates with the armature 122 of the motor. The mechanical oscillator 120 further comprises a linkage 123 coupling the optical fiber preform 50 to the plate 121 at pivot point 124. The linkage 123 is free to rotate about the pivot point 124.

As the plate 121 rotates with the armature 122, the pivot point 124 and the linkage 123 rotate with the plate 121, effectively displacing the linkage 123 (and the optical fiber preform 50 coupled to the linkage 123) in the ±z direction of the coordinate axes depicted in the figures, increasing the draw tension from the nominal draw tension and decreasing the draw tension to the nominal draw tension. Because the linkage 123 is free to rotate about the pivot point 124, the linkage 123 (and the optical fiber preform 50 coupled to the linkage 123) remain substantially vertical (i.e., parallel with the z axis of the coordinate axes depict in the drawings).

In the embodiment of the mechanical oscillator 120 depicted in FIG. 2, the magnitude of the increase in draw tension from the nominal draw tension is directly related to the distance the optical fiber preform 50 is displaced in the +z direction of the coordinate axes depicted in the figures which, in turn, is related to the length of the linkage 123 as well as the position of the pivot point 124 with respect to the armature 122. Accordingly, it should be understood that the magnitude of the increase in draw tension may be adjusted by adjusting the length of the linkage 123 and/or the position of the pivot point 124 with respect to the armature 122.

In embodiments, the armature 122 of the mechanical oscillator 120 may be rotated at a constant velocity such that the draw tension is periodically modulated and the stress perturbations are introduced into the multi-mode optical fiber 10 at regular intervals (i.e., the stress perturbations have a uniform pitch along the length of the multi-mode optical fiber 10). In other embodiments, the armature 122 of the velocity of the mechanical oscillator 120 may be randomly varied such that the draw tension is aperiodically modulated and the stress perturbations introduced into the multi-mode optical fiber 10 are at irregular intervals (i.e., the stress perturbations have a non-uniform pitch along the length of the multi-mode optical fiber 10).

While FIG. 2 depicts one embodiment of a mechanical oscillator 120 that may be used to vertically displace the optical fiber preform 50, it should be understood that other mechanical oscillators 120 are contemplated and possible. In general, any actuator capable of producing periodic or aperiodic translational motion may be suitable for vertically displacing the optical fiber preform and thereby modulating the draw tension applied to a multi-mode optical fiber drawn 151 drawn from the optical fiber preform 50.

Figure 3:
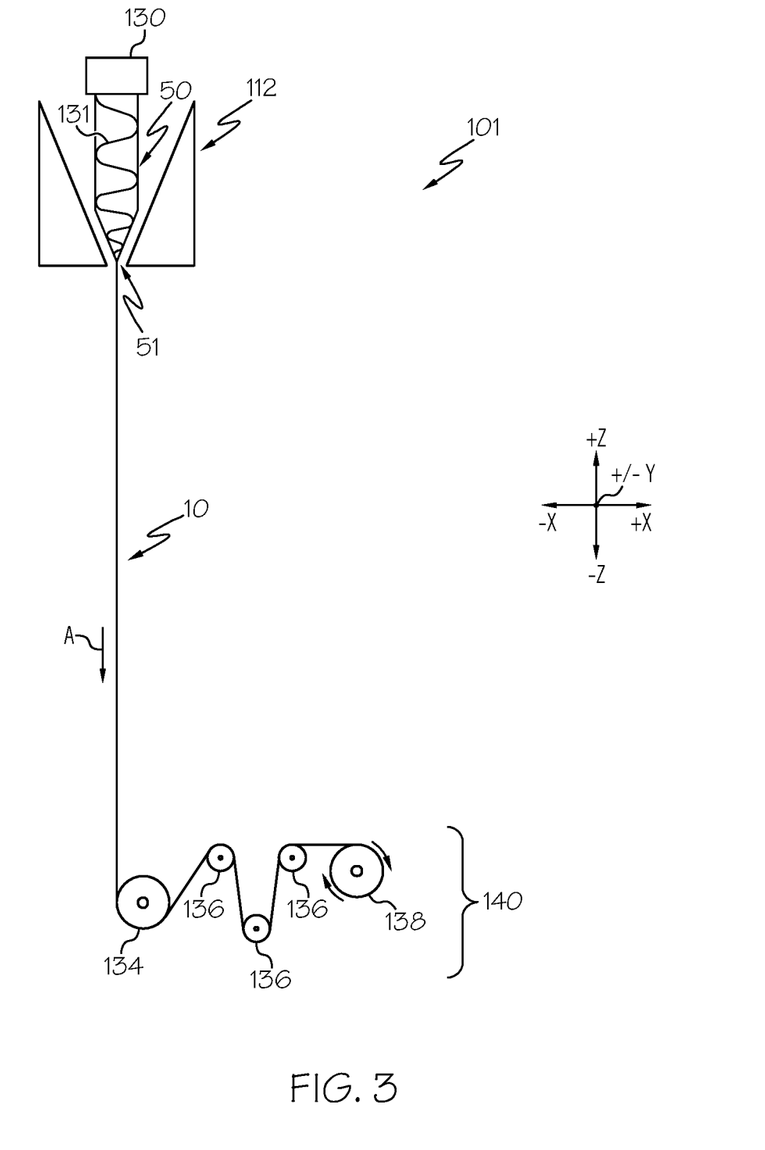
FIG. 3 schematically depicts a system for manufacturing multi-mode optical fiber according to one or more embodiments shown and described herein.

Referring now to FIG. 3, another embodiment of a system 101 for manufacturing multi-mode optical fiber 10 is schematically depicted. In this embodiment, the system 100 includes a draw furnace 112 and a tractor system 140 as described above with respect to FIG. 2. In this embodiment, the system 101 further comprises an acoustic transducer 130. The acoustic transducer 130 may be coupled to the optical fiber preform 50 and is used to couple acoustic energy into the optical fiber preform 50. The acoustic transducer 130 may be a electroacoustic transducer, a piezoelectric transducer or another, similar type of transducer suitable for coupling acoustic energy into the optical fiber preform 50.

In operation, the optical fiber preform 50 is heated in the draw furnace 112 and the nominal draw tension is applied to the root 51 of the optical fiber preform 50 on the long axis of the optical fiber preform 50 with the tractor system 140 thereby drawing a multi-mode optical fiber 10 from the root 51 of the optical fiber preform 50. The draw furnace 112 is generally oriented along a draw pathway schematically indicated by arrow A in FIG. 3. In the embodiments described herein the draw pathway A is generally vertical (i.e., parallel to the z-axis of the coordinate axes depicted in the figures).

As the multi-mode optical fiber 10 is drawn from the root 51 of the optical fiber preform 50, the acoustic transducer 130 introduces acoustic energy, such as an acoustic wave 131, into the optical fiber preform 50. The acoustic transducer 130 may be operated to provide a periodic acoustic wave 131 into the optical fiber preform 50. Alternatively, the acoustic transducer 130 may be operated to provide an aperiodic acoustic wave into the optical fiber preform. The acoustic wave 131 propagates through the optical fiber preform 50 to the root 51 causing the optical fiber preform 50 and the root 51 of the optical fiber preform 50 to vibrate.

As the acoustic wave 131 reaches the root, the vibrations caused by the acoustic wave 131 modulate the draw tension applied by the tractor system 140. Specifically, the draw tension exerted on the multi-mode optical fiber 10 by the tractor system 140 is periodically (or aperiodically) increased from the nominal draw tension due to the vibrations imparted to the optical fiber preform 50 by the acoustic transducer 130. The tensile stresses imparted to the multi-mode optical fiber 10 by the tractor system 140 (or by the tractor system 140 and the acoustic transducer 130) are frozen in to the multi-mode optical fiber 10 as the multi-mode optical fiber 10 is drawn in the -z direction and cooled, resulting in stress perturbations in the multi-mode optical fiber 10 and corresponding refractive index perturbations in at least a core of the multi-mode optical fiber. In embodiments, the stress perturbations are throughout the entire glass portion of the multi-mode optical fiber 10 (i.e., in both the core portion of the multi-mode optical fiber 10 and the cladding portion of the multi-mode optical fiber 151).

Figures 4A, 4B:
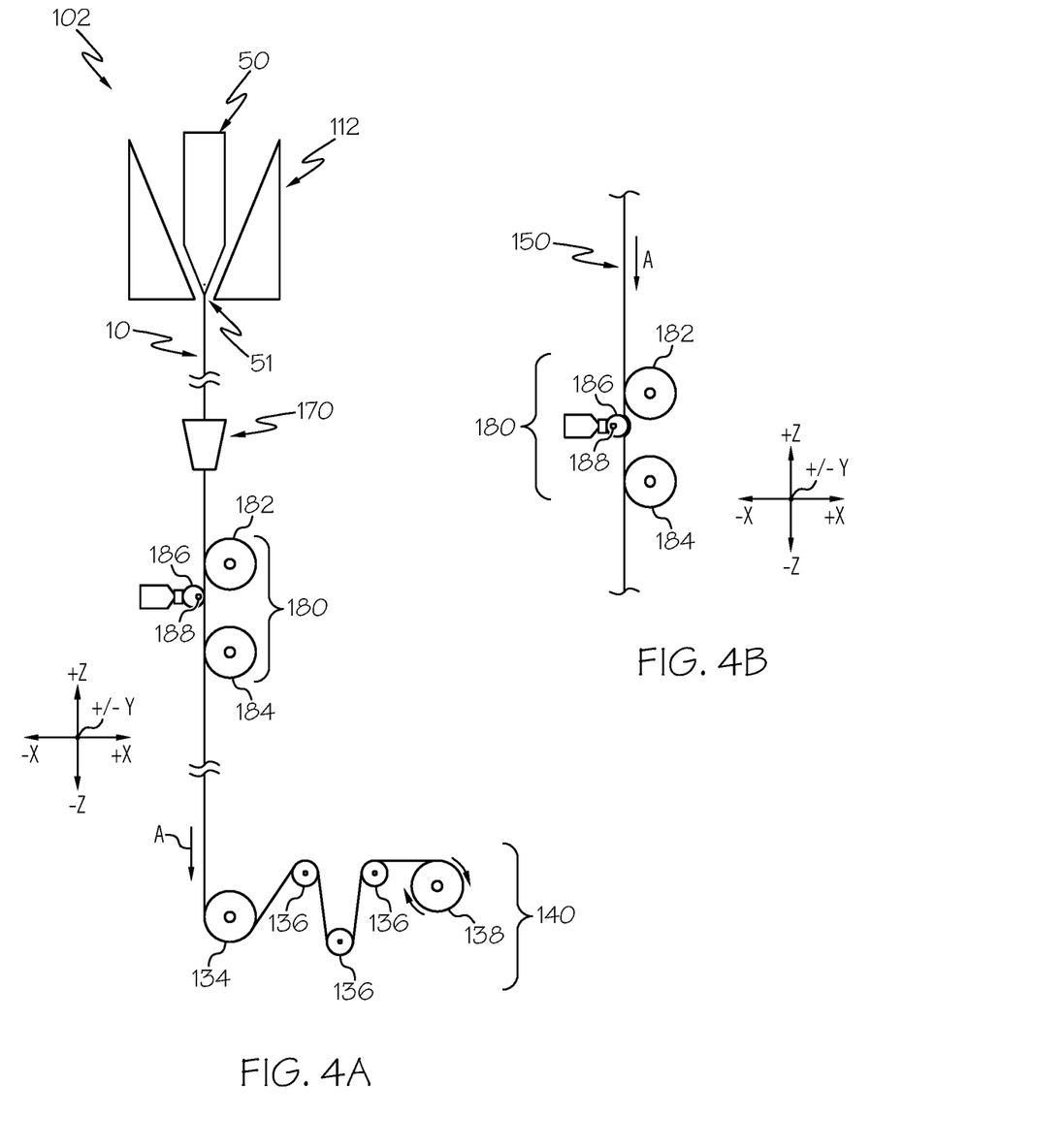
FIG. 4A schematically depicts a system for manufacturing multi-mode optical fiber according to one or more embodiments shown and described herein.
FIG. 4B schematically depicts the tension modulator of the system for manufacturing multi-mode optical fiber of FIG. 4A displacing a portion of the multi-mode optical fiber from the draw pathway to increase the draw tension.

Referring now to FIG. 4A, another embodiment of a system 102 for manufacturing multi-mode optical fiber 10 is schematically depicted. In this embodiment, the system 100 includes a draw furnace 112 and a tractor system 140 as described above with respect to FIGS. 2 and 3. In this embodiment, the system 102 further includes a coating applicator 170 for applying a polymeric coating or coatings to the multi-mode optical fiber 151. The coating applicator 170 is located along the draw pathway A upstream (i.e., in the +z direction of the coordinate axes depicted in the figures) of the tractor system 140. The system 102 also includes a tension modulator 180 positioned along the draw pathway A between the coating applicator 170 and the tractor system 140. The system 102 may further include a curing unit (not shown) positioned along the draw pathway A between the coating applicator 170 and the tension modulator 180. The curing unit may cure and harden the polymeric coating(s) applied to the multi-mode optical fiber 10 with the coating applicator 170.

In the embodiment of the system 102 for manufacturing multi-mode optical fiber 10 depicted in FIG. 4A, the tension modulator 180 is used to modulate the nominal draw tension applied to the optical fiber preform 50 by the tractor system 140. In the embodiment depicted in FIG. 4A, the tension modulator 180 comprises a first guide wheel 182, a second guide wheel 184, and an eccentric guide wheel 186. The first guide wheel 182 is positioned along the draw pathway A such that the multi-mode optical fiber 10 drawn on the draw pathway A is tangential to the first guide wheel 182 when the multi-mode optical fiber 10 contacts the first guide wheel 182. The second guide wheel 184 is located downstream (i.e., in the -z direction of the coordinate axes depicted in the figures) of the first guide wheel 182 and is positioned on the same side of the draw pathway A as the first guide wheel 182. The second guide wheel 184 is positioned such that the multi-mode optical fiber 10 drawn on the draw pathway A is tangential to the second guide wheel 184 when the multi-mode optical fiber 10 contacts the second guide wheel 184. The first guide wheel 182 and the second guide wheel 184 are passive and freely rotatable about their respective axes of rotation.

The eccentric guide wheel 186 is positioned along the draw pathway A downstream of the first guide wheel 182, upstream of the second guide wheel 184 and on the opposite side of the draw pathway A from the first guide wheel 182 and the second guide wheel 184. In the embodiment depicted in FIG. 4A, the eccentric guide wheel 186 is circular with an axis of rotation 188 that is offset from the geometric center of the circle. The eccentric guide wheel 186 is actively rotated, such as with a motor (not shown), and is positioned relative to the draw pathway A such that the multi-mode optical fiber 10 is tangential to the eccentric guide wheel 186 when the eccentric guide wheel 186 contacts the multi-mode optical fiber 10. As the eccentric guide wheel 186 is rotated, a portion of the guide wheel crosses over the draw pathway A at least once during each revolution of the eccentric guide wheel 186.

While the eccentric guide wheel 186 is depicted and described as being circular, it should be understood that other shapes are contemplated and possible. For example, the eccentric guide wheel 186 may be elliptical in cross section or ovoidal in cross section such that a portion of the guide wheel crosses over the draw pathway A at least one during each revolution of the guide wheel.

In operation, the optical fiber preform 50 is heated in the draw furnace 112 and the nominal draw tension is applied to the root 51 of the optical fiber preform 50 on the long axis of the optical fiber preform 50 with the tractor system 140 thereby drawing a multi-mode optical fiber 10 from the root 51 of the optical fiber preform 50 and along the draw pathway A in the −z direction of the coordinate axes depicted in the figures. The multi-mode optical fiber 10 is drawn through the coating applicator 170 where a polymeric coating is applied to the multi-mode optical fiber 10. The polymeric coating protects the glass portion of the multi-mode optical fiber 10 and facilitates making mechanical contact with the multi-mode optical fiber 10 without damaging the glass of the fiber.

After the polymer coating in applied to the multi-mode optical fiber 10, the multi-mode optical fiber 10 is drawn along the draw pathway A through the tension modulator 180. As the multi-mode optical fiber 10 passes through the tension modulator 180, the eccentric guide wheel 186 is actively rotated such that the eccentric guide wheel 186 mechanically contacts and displaces the multi-mode optical fiber 10 from the draw pathway A in a direction transverse to the draw pathway A, as depicted in FIG. 4B, at least once during each revolution of the eccentric guide wheel 186. When the eccentric guide wheel 186 displaces the multi-mode optical fiber 10 from the draw pathway A, a section of the multi-mode optical fiber 10 is impinged between the first guide wheel 182, the second guide wheel 184, and the eccentric guide wheel 186, thereby increasing the travel path of the multi-mode optical fiber 10 and, in turn, increasing the draw tension applied to the root 51 of the optical fiber preform 50 from the nominal tension. Due to the eccentricity of the eccentric guide wheel 186, the multi-mode optical fiber 10 is only displaced from the draw pathway A during a certain portion or portions of each revolution of the eccentric guide wheel 186 which, in turn, results in modulation of the draw tension.

The tensile stresses imparted to the multi-mode optical fiber 10 by the tractor system 140 (or by the tractor system 140 and the tension modulator 180) are frozen in to the multi-mode optical fiber 10 as the optical fiber 10 is drawn in the −z direction and cooled, resulting in stress perturbations in the multi-mode optical fiber 10 and corresponding refractive index perturbations in at least a core of the multi-mode optical fiber. In embodiments, the stress perturbations are throughout the entire glass portion of the multi-mode optical fiber 10 (i.e., in both the core portion of the multi-mode optical fiber 10 and the cladding portion of the multi-mode optical fiber 10).

When the eccentric guide wheel 186 is operated at a constant velocity, stress perturbations are periodically introduced into the multi-mode optical fiber 10. However, it should be understood that aperiodic stress perturbations may be introduced into the multi-mode optical fiber 10 by modulating the rotational velocity of the eccentric guide wheel 186, such as when the rotational velocity of the eccentric guide wheel 186 is randomly increased or decreased.

While the system 102 depicted in FIG. 4A utilizes a tension modulator 180 with an eccentric guide wheel 186, it should be understood that other embodiments of the tension modulator 180 are contemplated and possible. For example, in an alternative embodiment, the eccentric guide wheel 186 may be replaced with a circular guide wheel in which the axis of rotation of the guide wheel is concentric with the wheel. In this embodiment, the guide wheel may be coupled to an actuator, such as an electromechanical actuator, pneumatic actuator or the like, which periodically (or aperiodically) adjusts the position of the guide wheel in the ±x direction of the coordinate axes depicted in the figures. This has the effect of periodically (or aperiodically) displacing the multi-mode optical fiber from the draw pathway A as described above and, in turn, modulating the draw tension.

While FIGS. 2-4A depict various embodiments of systems for manufacturing multi-mode optical fiber in which the draw tension is modulated to produce stress perturbations in the multi-mode optical fiber, it should be under stood that other systems for modulating the draw tension are contemplated and possible. For example, in another embodiment (not shown), the draw tension may be modulated with the tractor system, such as when the rotational velocity of one or more of the pulleys and/or fiber take-up spool is modulated. Alternatively, the vertical position of the entire tractor system may be modulated to, in turn, modulate the draw tension.

In the embodiments of the methods for introducing stress perturbations in multi-mode optical fibers described herein, the stress perturbations in the multi-mode optical fiber are introduced in the multi-mode optical fiber by increasing (and subsequently decreasing) the draw tension applied to the root of the optical fiber preform by greater than or equal to 1 gram and less than or equal to 50 grams. In embodiments, the stress perturbations in the multi-mode optical fiber are introduced in the multi-mode optical fiber by increasing (and subsequently decreasing) the draw tension applied to the root of the optical fiber preform by greater than or equal to 1 gram and less than or equal to 25 grams. In still other embodiments, the stress perturbations in the multi-mode optical fiber are introduced in the multi-mode optical fiber by increasing (and subsequently decreasing) the draw tension applied to the root of the optical fiber preform by greater than or equal to 5 gram and less than or equal to 15 grams. In yet other embodiments, the stress perturbations in the multi-mode optical fiber are introduced in the multi-mode optical fiber by increasing (and subsequently decreasing) the draw tension applied to the root of the optical fiber preform by greater than or equal to 5 gram and less than or equal to 10 grams.

Figure 5:
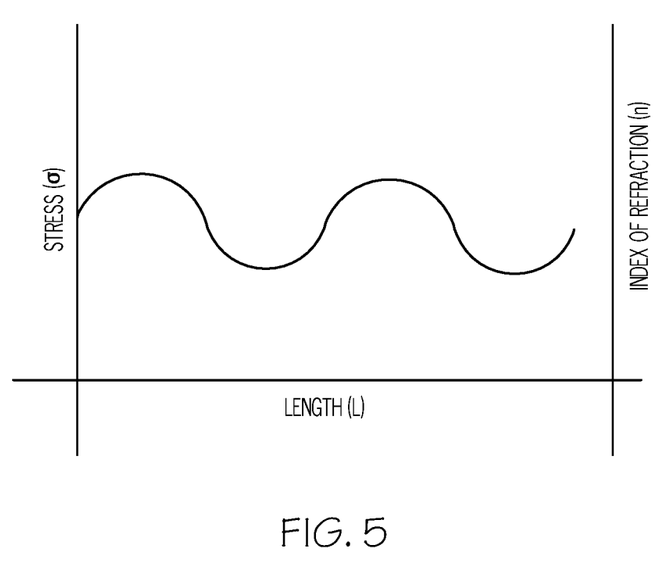
FIG. 5 graphically depicts the stress ($\sigma$, left y-ordinate) and index of refraction (n, right y-ordinate) as a function of length (x-ordinate) for a hypothetical multi-mode optical fiber produced according to one or more of the methods shown and described herein.

In the embodiments of the multi-mode optical fiber described herein, the stress perturbations in the glass portion of the optical fiber (i.e., the stress perturbations in the core portion of the multi-mode optical fiber and the stress perturbations in the cladding portion of the multi-mode optical fiber) vary as a function of the length of the multi-mode optical fiber. In turn, the index of refraction of the core portion of the multi-mode optical fiber varies as a function of the length of the multi-mode optical fiber. For example, FIG. 5 graphically depicts the stress (σ, left y-ordinate) and index of refraction (n, right y-ordinate) as a function of length (x-ordinate) of a hypothetical multi-mode optical fiber produced according to one or more of the methods shown and described herein. In this hypothetical multi-mode optical fiber, the stress (i.e., the stress perturbation) in the multi-mode optical fiber varies periodically (roughly sinusoidally) as a function of the length L of the multi-mode optical fiber. As shown in FIG. 5, variations in the stress of the multi-mode optical fiber correspond to variations in the index of refraction (i.e., index of refraction perturbations).

In the embodiments described herein, the pitch of the stress perturbations in the multi-mode optical fiber is a function of the draw speed of the multi-mode optical fiber and the frequency at which the draw tension is modulated. Specifically:

$$\Lambda = v/f,$$

where $\Lambda$ is the pitch of the stress perturbation, v is the draw speed (m/s) of the multi-mode optical fiber, and f is the frequency (Hz) at which the draw tension is modulated. This is assuming that the frequency at which the draw tension is modulated is periodic rather than aperiodic.

In the embodiments described herein the multi-mode optical fibers have stress perturbations with a pitch greater than or equal to 0.1 mm and less than or equal to 50 mm. In embodiments, the multi-mode optical fibers have stress perturbations with a pitch greater than or equal to 0.1 mm and less than or equal to 25 mm. In still other embodiments, the multi-mode optical fibers have stress perturbations with a pitch greater than or equal to 0.5 mm and less than or equal to 15 mm. In yet other embodiments, the multi-mode optical fibers have stress perturbations with a pitch greater than or equal to 0.5 mm and less than or equal to 15 mm.

As the stress perturbations in the multi-mode optical fibers correspond to index of refraction perturbations in the optical fiber, it should be understood that the multi-mode optical fiber described herein have index of refraction perturbations with a pitch greater than or equal to 0.1 mm and less than or equal to 50 mm. In embodiments, the multi-mode optical fibers have index of refraction perturbations with a pitch greater than or equal to 0.1 mm and less than or equal to 25 mm. In still other embodiments, the multi-mode optical fibers have index of refraction perturbations with a pitch greater than or equal to 0.5 mm and less than or equal to 15 mm. In yet other embodiments, the multi-mode optical fibers have index of refraction perturbations with a pitch greater than or equal to 0.5 mm and less than or equal to 15 mm.

In embodiments where the draw tension is aperiodically modulated, the stress perturbations (and hence the corresponding index of refraction perturbations) will have an irregular pitch over the length of the optical fiber.

Axial stress verses the length of the multi-mode optical fiber was measured with an IFA-100 from Interfiber Analysis using the Mach-Zehnder interferometer method. The amplitude of the peak core stress is compared to the average stress in the outer cladding region of the multi-mode optical fiber and is referred to herein as TS-core. The variation in core stress along the length of the optical fiber within the modulation period is referred to herein as $\Delta_{TS\text{-}core}$. In embodiments, $\Delta_{TS\text{-}core} \geq 500$ kPa due to modulation of the draw tension. That is, in segments of the multi-mode optical fiber drawn with an increased draw tension, $\Delta_{TS\text{-}core} \geq 500$ kPa which results in a change in the index of refraction in the core portion along the length of the multi-mode optical fiber. In other embodiments, $\Delta_{TS\text{-}core} \geq 1000$ kPa due to modulation of the draw tension, in other embodiments, $\Delta_{TS\text{-}core} \geq 2000$ kPa due to modulation of the draw tension, and in other embodiments, $\Delta_{TS\text{-}core} \geq 5000$ KPa due to modulation of the draw tension.

It has been found that variations in the diameter of the multi-mode optical fiber over the length of the fiber may increase the difficulty of splicing and/or connectorizing the multi-mode optical fiber. For example, variations in the diameter of different lengths of multi-mode optical fiber that are spliced together may make alignment of the end-faces of the different lengths of fiber difficult, potentially resulting in a loss of optical power at the splice. In order to mitigate these difficulties, the multi-mode optical fibers described herein are produced such that the diameter of the multi-mode optical fiber is substantially the same along the length of the fiber. Specifically, in the embodiments described herein, the change in the diameter of the multi-mode optical fiber which corresponds to the stress perturbations introduced in the multi-mode optical fiber is less than 2 nm, less than 1 nm, or even less than 0.5 nm. Said differently, in the embodiments described herein, the diameter variation in the multimode optical fiber which is synchronized with the stress perturbations introduced in the optical fiber is less than 2 nm, less than 1 nm, or even less than 0.5 nm.

As noted above, the multi-mode optical fibers described herein have an increased wavelength operating window which provides for higher bandwidth operation of the multi-mode optical fiber over a broad range of wavelengths. This increase in the wavelength operating window is attributable to the core portion of the multi-mode optical fiber having localized variations in the index of refraction due to stress perturbations along the axial length of the multi-mode optical fiber. These stress perturbations decrease the sensitivity of the peak bandwidth of the multi-mode optical fiber to variations in wavelength enabling the multi-mode optical fiber to operate at relatively high bandwidths over a relatively broad range of wavelengths (i.e., the fibers have an enlarged wavelength operating window).

In the embodiments described herein, the multi-mode optical fibers have a bandwidth greater than or equal to 3000 MHz-km (3 GHz-km) for each wavelength within a wavelength operating window having a width greater than 100 nm. In embodiments, BW≥4000 MHz-km (4 GHz-km) for each wavelength within a wavelength operating window having a width greater than 90 nm. In embodiments, BW≥5000 MHz-km (4 GHz-km) for each wavelength within a wavelength operating window having a width greater than 70 nm. The wavelength operating window may be centered on at least one wavelength within an operating wavelength range from about 850 nm to about 1550 nm. For example, in one embodiment, the width of the wavelength operating window may be 200 nm and the wavelength operating window may be centered at an operating wavelength of 850 nm (i.e., the wavelength operating window extends from 750 nm to 950 nm). In this example, the multi-mode optical fiber will have a bandwidth of greater than 3 GHz-km for wavelengths of light from about 750 nm to about 950 nm propagating within the optical fiber.

In embodiments, the wavelength operating window may be centered on at least one of 850 nm±10 nm, 980 nm±10 nm, 1060 nm±10 nm, 1310 nm±10 nm, 1500 nm±10 nm or 1550 nm±10 nm. In some embodiments, the multi-mode optical fibers have a bandwidth greater than 3000 MHz-km (3 GHz-km) or even greater than 4000 MHz-km (4 GHz-km) within the wavelength operating window. In some other embodiments, the multi-mode optical fibers have a bandwidth greater than 4700 MHz-km (4.7 GHz-km) within the wavelength operating window. In some embodiments, the wavelength operating window may have a width greater than about 150 nm or even greater than about 200 nm.

In some embodiments, the multi-mode optical fibers described herein have a peak bandwidth of greater than 2000 MHz-km (2.0 GHz-km), or greater than 4000 MHz-km (4 GHz-km), or greater than 4700 MHz-km (4.7 GHz-km), or greater than 6000 MHz-km (6 GHz-km), or greater than 8000 MHz-km (8 GHz-km), or greater than 10000 MHz-km (10 GHz-km) at an operating wavelength of 850 nm±10 nm. In some other embodiments, the multi-mode optical fibers described herein have a peak bandwidth of greater than 2000 MHz-km (2.0 GHz-km)), or greater than 4000 MHz-km (4 GHz-km), or greater than 4700 MHz-km (4.7 GHz-km), or greater than 6000 MHz-km (6 GHz-km), or greater than 8000 MHz-km (8 GHz-km), or greater than 10000 MHz-km (10 GHz-km) at an operating wavelength of 980 nm±10 nm. In other embodiments, the multi-mode optical fibers described herein have a peak bandwidth of greater than 2000 MHz-km (2.0 GHz-km)), or greater than 4000 MHz-km (4 GHz-km), or greater than 4700 MHz-km (4.7 GHz-km), or greater than 6000 MHz-km (6 GHz-km), or greater than 8000 MHz-km (8 GHz-km), or greater than 10000 MHz-km (10 GHz-km) at an operating wavelength of 1060 nm±10 nm. In still other embodiments, the multi-mode optical fibers described herein have a peak bandwidth of greater than 2000 MHz-km (2.0 GHz-km)), or greater than 3000 MHz-km (3 GHz-km), or greater than 4000 MHz-km (4 GHz-km), or even greater than 4700 MHz-km (4.7 GHz-km) at an operating wavelength of 1310 nm±10 nm. In other embodiments, the multi-mode optical fibers described herein have a peak bandwidth of greater than 2000 MHz-km (2.0 GHz-km)), or greater than 3000 MHz-km (3 GHz-km), or greater than 4000 MHz-km (4 GHz-km), or even greater than 4700 MHz-km (4.7 GHz-km) at an operating wavelength of 1500 nm±10 nm. In yet other embodiments, the multi-mode optical fibers described herein have a peak bandwidth of greater than 2000 MHz-km (2.0 GHz-km)), or greater than 3000 MHz-km (3 GHz-km), or greater than 4000 MHz-km (4 GHz-km), or even greater than 4700 MHz-km (4.7 GHz-km) at an operating wavelength of 1510 nm±10 nm.

EXAMPLES

The embodiments described herein will be further clarified by the following examples.

Example 1

Figure 6:
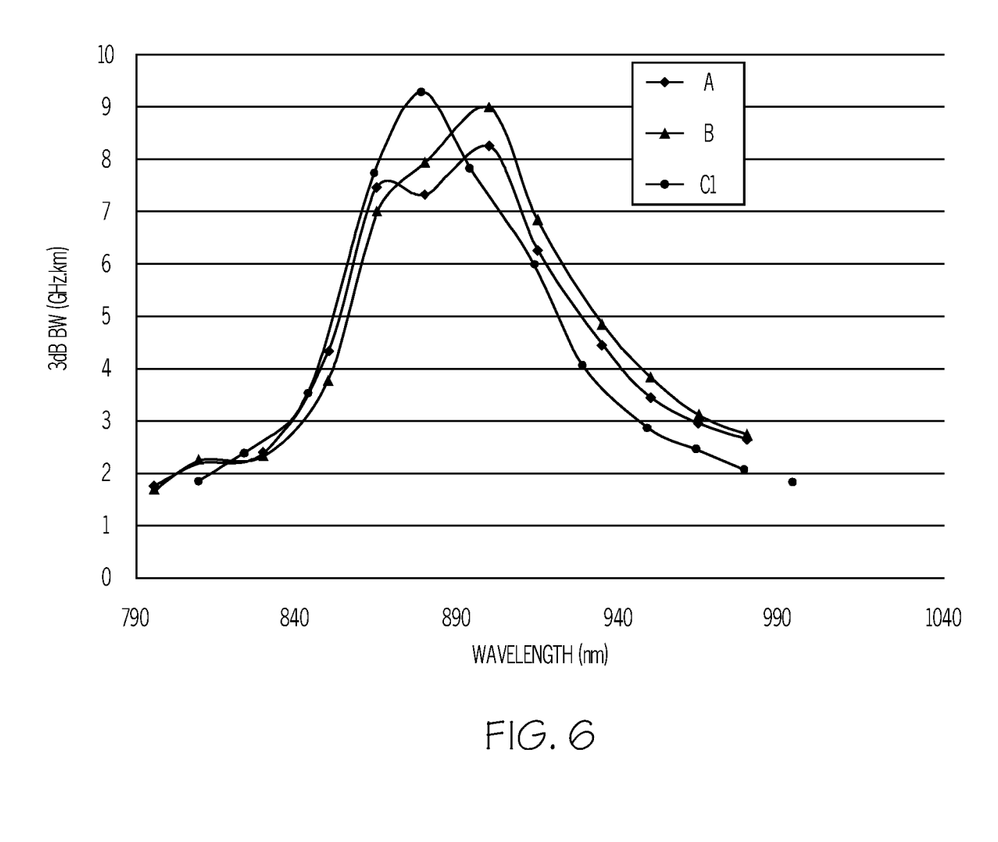
FIG. 6 graphically depicts the bandwidth (y-ordinate) as a function of wavelength (x-ordinate) for a control multi-mode optical fiber (i.e., without stress perturbations) and two inventive multi-mode optical fibers (i.e., with stress perturbations) produced with a system similar to that depicted in FIG. 2.

Two multi-mode fibers (fiber A and fiber B) having the same structure and composition were drawn with the system schematically depicted in FIG. 2. The multi-mode optical fibers were drawn from the root of the optical fiber preform with a draw tension of 90 g at a draw speed of 8 m/min (i.e., v=8 m/min). The draw tension applied as fiber A was drawn from the root was modulated at a frequency f of 125 Hz resulting in a stress perturbation pitch $\Lambda$ of 1.07 mm in the multi-mode optical fiber. The draw tension applied as fiber B was drawn from the root was modulated at a frequency f of 150 Hz resulting in a stress perturbation pitch $\Lambda$ of 0.89 mm in the multi-mode optical fiber. A control fiber (fiber C1) having the same structure and composition as fibers A and B was also drawn from the root of the optical fiber preform with a draw tension of 90 g at a draw speed of 8 m/min but without any modulation of the draw tension. The bandwidth of fibers A, B, and C1 was then measured for wavelengths from 790 nm to 990 nm. The bandwidth (y-ordinate) as a function of wavelength (x-ordinate) is graphically depicted in FIG. 6.

Figure 7:
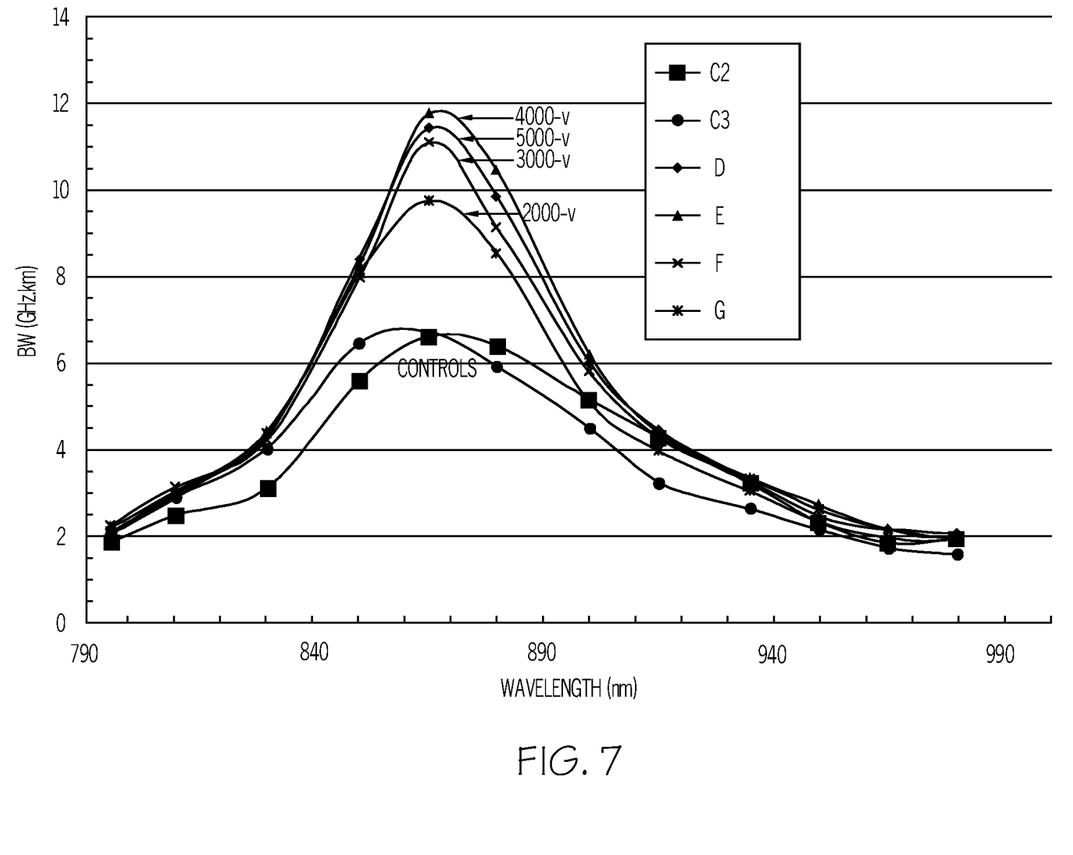
FIG. 7 graphically depicts the bandwidth (y-ordinate) as a function of wavelength (x-ordinate) for two control multimode optical fibers (i.e., without stress perturbations) and four inventive multi-mode optical fibers (i.e., with stress perturbations) produced with a system similar to that depicted in FIG. 4A.

As shown in FIG. 7, the peak bandwidth of fibers A, B, and C1 are similar. However, the width of the bandwidth windows for each of fiber A and fiber B for a bandwidth of 3 GHz-km was greater than the width of the bandwidth window for fiber C1 at a bandwidth of 3 GHz-km by approximately 16%. This data demonstrates that the introduction of stress perturbations by modulating the draw tension is effective for increasing the bandwidth window of the multi-mode optical fiber and desensitizing the bandwidth of the multi-mode optical fiber to variations in wavelength.

Example 2

Four multi-mode fibers (fiber D, fiber E, fiber F, and fiber G) having the same structure and composition were drawn with the system schematically depicted in FIG. 4. The multi-mode optical fibers were drawn from the root of the optical fiber preform at a draw speed of 1 m/s (i.e., v=1 m/s). The rotating guide wheel of the tension modulator was driven at a rotational velocity v of 2000 rpm (fiber D), 3000 rpm (fiber E), 4000 rpm (fiber F), and 5000 rpm (fiber G) during the draw. These rotational speeds correspond to modulating the draw tension applied to the root of the optical fiber preform at frequencies (i.e., f) of 33 Hz, 50 Hz, 67 Hz, and 83 Hz, respectively. The modulation of the draw tension corresponded to a stress perturbation pitch (i.e., $\Lambda$) in each of fiber D, fiber E, fiber F, and fiber G of 30 mm, 20 mm, 15 mm, and 12 mm, respectively. Two control fiber (fibers C2 and C3) having the same structure and composition as fiber D, fiber E, fiber F, and fiber G were also drawn from the root of the optical fiber preform at a draw speed of 8 m/min but without any modulation of the draw tension. The nominal draw tension for all fibers in Example 2 was 90 grams. The bandwidth of fibers C2, C3, D, E, F, and G was then measured for wavelengths from 790 nm to 990 nm. The bandwidth (y-ordinate) as a function of wavelength (x-ordinate) is graphically depicted in FIG. 7.

As shown in FIG. 7, the peak bandwidth of fibers D, E, F, and G is greater than the peak bandwidth of control fibers C2 and C3. Further, the width of the bandwidth windows for each of fiber D, fiber E, fiber F, and fiber G for a bandwidth of 3 GHz-km was greater than the width of the bandwidth window for control fiber C1 and control fiber C2 at a bandwidth of 3 GHz-km by approximately 16%. This data demonstrates that the introduction of stress perturbations by modulating the draw tension is effective for increasing the bandwidth window of the multi-mode optical fiber and desensitizing the bandwidth of the multi-mode optical fiber to variations in wavelength.

While reference has been made herein to multi-mode optical fiber with specific structures, it should be understood that the techniques described herein may be used to increase the wavelength operating window of all multi-mode optical fibers through the introduction of stress perturbations as the multi-mode optical fibers are drawn from an optical fiber preform.

Based on the foregoing, it should now be understood that the methods for manufacturing multi-mode optical fiber result in multi-mode optical fibers which have relatively high bandwidths over a relatively broad range of operating wavelengths due to the stress perturbations introduced in the multi-mode optical fiber during manufacture. The stress perturbations increase the bandwidth of the multi-mode optical fiber and desensitize the peak bandwidth of the multi-mode optical fiber to changes in the alpha profile and, hence, desensitize the peak bandwidth to wavelength. The multi-mode optical fibers are particularly suitable for applications requiring higher bandwidths over a broad range of operating wavelengths.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for forming an optical fiber comprising:
   heating a multi-mode optical fiber preform;
   applying a draw tension to a root of the multi-mode optical fiber preform on a long axis of the multi-mode optical fiber preform thereby drawing a multi-mode optical fiber from the root of the multi-mode optical fiber preform; and
   modulating the draw tension while the multi-mode optical fiber is drawn from the root of the multi-mode optical fiber preform, wherein:
   modulating the draw tension comprises vertically displacing the multi-mode optical fiber preform along a vertical axis parallel to the long axis of the multi-mode optical fiber preform; and
   modulating the draw tension introduces stress perturbations in the multi-mode optical fiber and corresponding refractive index perturbations in a core of the multi-mode optical fiber.

2. The method of claim 1, wherein the draw tension is periodically modulated.

3. The method of claim 1, wherein the draw tension is aperiodically modulated.

4. The method of claim 1, wherein the stress perturbations in the multi-mode optical fiber have a pitch greater than or equal to 0.1 mm and less than or equal to 50 mm.

5. The method of claim 1, wherein modulating the draw tension comprises increasing the draw tension by greater than or equal to 1 gram and less than or equal to 50 grams.

6. The method of claim 1, wherein a diameter variation of the multi-mode optical fiber synchronized with the stress perturbations introduced in the multi-mode optical fiber is less than 2 nm.

7. A method for forming an optical fiber comprising:
   heating an optical fiber preform;
   applying a draw tension to a root of the optical fiber preform on a long axis of the optical fiber preform thereby drawing a multi-mode optical fiber from the root of the optical fiber preform;
   drawing the multi-mode optical fiber through a tension modulator, wherein an eccentric guide wheel of the tension modulator contacts and displaces the multi-mode optical fiber from a draw pathway of the multi-mode optical fiber in a direction transverse to the draw pathway, thereby modulating the draw tension, wherein modulating the draw tension introduces stress perturbations in the multi-mode optical fiber and corresponding refractive index perturbations in a core of the multi-mode optical fiber.

8. The method of claim 7, wherein the tension modulator further comprises:
   a first guide wheel located on a first side of the draw pathway of the multi-mode optical fiber;
   a second guide wheel located on the first side of the draw pathway of the multi-mode optical fiber and vertically offset from the first guide wheel; and
   the eccentric guide wheel is located on a second side of the draw pathway of the multi-mode optical fiber opposite the first side and at a vertical elevation between the first guide wheel and the second guide wheel, wherein the eccentric guide wheel is actively rotated and impinges at least a section of the multi-mode optical fiber between the first guide wheel, the second guide wheel and the eccentric guide wheel thereby modulating the draw tension.

9. The method of claim 7, wherein the eccentric guide wheel is rotated at a constant velocity.

10. The method of claim 7, wherein a rotational velocity of the eccentric guide wheel is modulated.

11. The method of claim 7, wherein the stress perturbations in the optical fiber have a pitch greater than or equal to 0.1 mm and less than or equal to 50 mm.

12. A method for forming an optical fiber comprising:
    heating a multi-mode optical fiber preform;
    applying a draw tension to a root of the multi-mode optical fiber preform on a long axis of the multi-mode optical fiber preform thereby drawing a multi-mode optical fiber from the root of the multi-mode optical fiber preform; and
    modulating the draw tension while the multi-mode optical fiber is drawn from the root of the multi-mode optical fiber preform, wherein:
    modulating the draw tension introduces stress perturbations in the multi-mode optical fiber and corresponding refractive index perturbations in a core of the multi-mode optical fiber; and
    a diameter variation of the multi-mode optical fiber synchronized with the stress perturbations introduced in the multi-mode optical fiber is less than 2 nm.

13. The method of claim 12, wherein the draw tension is periodically modulated.

14. The method of claim 12, wherein the draw tension is aperiodically modulated.

15. The method of claim 12, wherein the stress perturbations in the multi-mode optical fiber have a pitch greater than or equal to 0.1 mm and less than or equal to 50 mm.

16. The method of claim 12, wherein modulating the draw tension comprises increasing the draw tension by greater than or equal to 1 gram and less than or equal to 50 grams.

17. The method of claim 12, wherein modulating the draw tension comprises vertically displacing the multi-mode optical fiber preform along a vertical axis parallel to the long axis of the multi-mode optical fiber preform.

18. The method of claim 12, wherein modulating the draw tension comprises coupling an acoustic wave into the multi-mode optical fiber preform.

19. The method of claim 12, wherein modulating the draw tension comprises directing the multi-mode optical fiber through a tension modulator comprising:
    a first guide wheel located on a first side of a draw pathway of the multi-mode optical fiber;
    a second guide wheel located on the first side of the draw pathway of the multi-mode optical fiber and vertically offset from the first guide wheel; and
    an eccentric guide wheel located on a second side of the draw pathway of the multi-mode optical fiber opposite the first side and at a vertical elevation between the first guide wheel and the second guide wheel, wherein the eccentric guide wheel contacts and displaces the multi-mode optical fiber from the draw pathway of the multi-mode optical fiber in a direction transverse to the draw pathway, impinging at least a section of the multi-mode optical fiber between the first guide wheel, the second guide wheel and the eccentric guide wheel and thereby modulating the draw tension.

\* \* \* \* \*